United States Patent
Brown et al.

(10) Patent No.: US 7,479,968 B2
(45) Date of Patent: Jan. 20, 2009

(54) SEMI-TRANSPARENT HIGHLIGHTING OF SELECTED OBJECTS IN ELECTRONIC DOCUMENTS

(75) Inventors: Sara Melanie Brown, Palo Alto, CA (US); Ryan Hill, Mountain View, CA (US); Amit Kumar, East Palo Alto, CA (US); Robert Parker, Burlingame, CA (US); Dachuan Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 11/344,396

(22) Filed: Jan. 31, 2006

(65) Prior Publication Data
US 2007/0176944 A1 Aug. 2, 2007

(51) Int. Cl.
| G09G 5/00 | (2006.01) |
| G09G 5/02 | (2006.01) |
| G06K 9/00 | (2006.01) |
| G06K 9/35 | (2006.01) |
| G06F 17/00 | (2006.01) |
| G06T 11/00 | (2006.01) |
| H04N 1/46 | (2006.01) |
| H04N 1/387 | (2006.01) |
| G06K 9/20 | (2006.01) |
| G06K 9/34 | (2006.01) |
| G06F 3/048 | (2006.01) |

(52) U.S. Cl. .......... 345/592; 345/589; 345/619; 345/629; 345/470; 382/164; 382/282; 382/284; 715/200; 715/700; 715/764; 358/537; 358/538; 358/452; 358/453

(58) Field of Classification Search ............... 345/501, 345/589–594, 597, 581, 619, 629–630, 470, 345/549, 156–163, 551, 565, 620–626, 636, 345/467–468, 543, 563, 593; 715/200, 209, 715/240–247, 252, 256, 273, 700, 764, 769, 715/780, 800, 815, 856, 855, 860, 253; 358/537–538, 358/452–453, 448; 382/284
See application file for complete search history.

(56) References Cited

U.S. PATENT DOCUMENTS 5,920,694 A 7/1999 Carleton et al. ......... 395/200.35

(Continued)

FOREIGN PATENT DOCUMENTS

EP 1002267 2/1999

(Continued)

OTHER PUBLICATIONS

PCT Search Report dated May 30, 2007 cited in International Application No. PCT/US2007/001545.

(Continued)

*Primary Examiner*—Wesner Sajous
(74) *Attorney, Agent, or Firm*—Merchant & Gould P.C.

(57) ABSTRACT

Highlighting selected objects in an electronic document is provided in a manner such that a highlighted object maintains coloring and formatting properties to allow for a maintenance of visual fidelity with a pre-highlighted view of the highlighted object and that allows for a semi-transparent background underneath a highlighted object that allows a user to see and appreciate the coloring and any visual properties applied to the background underneath the highlighting applied to the selected object.

20 Claims, 6 Drawing Sheets

U.S. PATENT DOCUMENTS

| | | | |
|---|---|---|---|
| 6,151,426 A | 11/2000 | Lee et al. | 382/319 |
| 6,263,122 B1 | 7/2001 | Simske et al. | 382/311 |
| 6,385,351 B1 | 5/2002 | Simske et al. | 382/312 |
| 6,842,182 B2 | 1/2005 | Ungar et al. | 345/589 |
| 6,891,551 B2 | 5/2005 | Keely et al. | 345/762 |
| 2004/0032389 A1 | 2/2004 | Liang et al. | 345/107 |
| 2004/0075699 A1* | 4/2004 | Franchi et al. | 345/860 |
| 2004/0080532 A1 | 4/2004 | Cragun et al. | 345/745 |
| 2005/0134606 A1 | 6/2005 | Hong et al. | 345/619 |
| 2005/0149871 A1 | 7/2005 | Broman et al. | 715/724 |
| 2005/0149882 A1* | 7/2005 | Iwema et al. | 715/860 |
| 2007/0040470 A1* | 2/2007 | Watanabe | 310/316.01 |
| 2008/0027933 A1* | 1/2008 | Hussam | 707/6 |

FOREIGN PATENT DOCUMENTS

EP    1 363 185 A2    11/2003

OTHER PUBLICATIONS

Our Powerpoint Templates Features, http://www.powerpointtemplates.com/powerpoint-templates-features.html, Dec. 7, 2005, 3 pages.

Flash Video Template: Spokesperson Presentation With Synchronized Graphics, http://www.macromedia.com/devnet/flash/articles/vidtemplate_corppreso_0.5.html, Dec. 7, 2005, 5 pages.

PowerPlugs: Video Backgrounds Player & Content, http://www.crystalgraphics.com/powerpoint/video.backgrounds.main.asp, Dec. 7, 2005, 4 pages.

Boguraev et al., Dynamic Document Presentation, http://www.sigchi.org/bulletin/1998.2/boguraev2.html, Dec. 7, 2005, 10 pages.

Faraday et al., Making Contact Points Between Text and Images, http://delivery.acm.org/10.1145/300000/290752/p29-faraday.pdf?key1=290752&key2=6266593311&coll=GUIDE&dl=GUIDE&CFID=62365169&CFTOKEN=51425331.

* cited by examiner

SEMI-TRANSPARENT HIGHLIGHTING OF SELECTED OBJECTS IN ELECTRONIC DOCUMENTS

BACKGROUND

During entry and editing of text, images or other objects in electronic documents, users frequently desire to select a given object for formatting, copying, moving, deleting or otherwise applying some application functionality to the selected object. According to prior methods and systems, a selected object is highlighted to indicate that the selected object will be affected by a subsequent selection of application functionality applicable to the selected object. According to prior methods and systems, a color of the object and a color of a background behind the selected object are inversed in order to create a contrasting view to identify the selected object. Unfortunately, such techniques result in an inability of the user to see some text colors and other visual formatting properties applied to a selected object (text, image or other object) while the contrasting highlighting is displayed. In addition, the inverse of the coloring of some objects and backgrounds in the red/green/blue (RGB) color range creates a color value that is only slightly different in intensity from the starting value which requires an additional color application to create a contrasting highlighting for the selected object and/or background.

Accordingly, there is a need for improved methods, systems and computer products for highlighting selected text entries, images and other objects in electronic documents. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing for highlighting selected text entries, images and other objects in electronic documents. According to one embodiment, upon receiving a selection of a text entry, image or other object in an electronic document, an off-screen bitmap image is generated for preparing a highlighting overlay for applying to the selected object. According to one aspect, the off-screen bitmap image is generated to a size matching the selected object in the electronic document. A path is constructed in the bitmap image corresponding to an outline around the selected object. For example, for a selected text entry, a generally rectangular-shaped path is constructed around the text selection. For multiple lines of selected text, a generally rectangular-shaped path is constructed around each line of selected text. Each path constructed around each portion of the selected object, for example, each generally rectangular-shaped path around each line of selected text, is merged geometrically into a single path extending around a perimeter of the selected object, for example, selected lines of text.

A semi-transparent line is drawn over the single path that outlines the selected object for generating a border that will be displayed around the selected object. According to one embodiment, a second semi-transparent line having a differing transparency value to the first semi-transparent line and being narrower than the first semi-transparent line is drawn over the first semi-transparent line for generating a beveled appearance of the line forming an outline around the selected content.

The interior space bounded by the path and overlapping semi-transparent lines is filled with color pixels having a color value that generally matches the operating system color in use by the system responsible for displaying a background on which the selected object is currently displayed. The color pixels applied to the interior space have a transparency value set to a level that generates a semi-transparent view. According to one embodiment, instead of blending the color onto the off-screen bitmap image, the color applied to the interior space of the path replaces pre-existing colors inside the path. Thus, overlapping and/or intersecting path lines drawn between lines of selected text or between adjacent path constructs are removed by the application of color in the interior of the outlining path and border lines.

The off-screen bitmap image is then drawn onto the display screen on which the selected object is displayed such that the bitmap image overlays the selected object. The selected object, for example, a text entry, is then drawn onto the bitmap image that is applied to the display screen. According to embodiments, the resulting image allows for a viewing of the selected object on top of the bitmap image according to its unaltered coloring and/or other formatting properties and allows for a viewing through the semi-transparent highlighting of the bitmap image to the underlying coloring and other display properties of the display screen on which the selected object is displayed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to highlighting selected objects in an electronic document in a manner such that a highlighted object maintains coloring and formatting properties to allow for a maintenance of visual fidelity with a pre-highlighted view of the highlighted object and that allows for a semi-transparent background underneath a highlighted object that allows a user to see and appreciate the coloring and any other visual properties applied to the background underneath the highlighting applied to the selected object.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
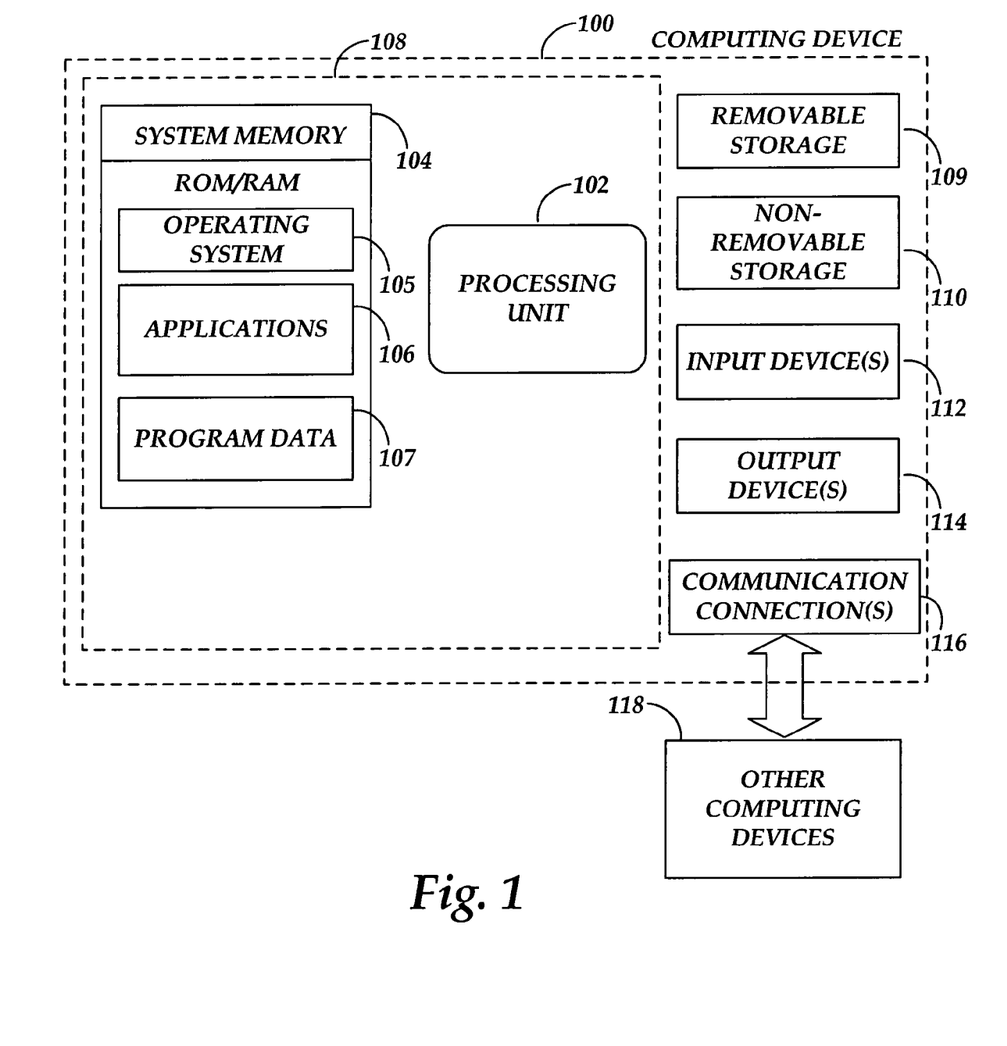
FIG. 1 illustrates an exemplary computing operating environment.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as an electronic mail program, a calendaring program, an Internet browsing program, and the like. An example of such programs is OUTLOOK® manufactured by MICROSOFT CORPORATION. The application 106 may include a number of other types of software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the application 106 is illustrative of any software application operable to highlight a selected object displayed on an electronic display screen, as described herein.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
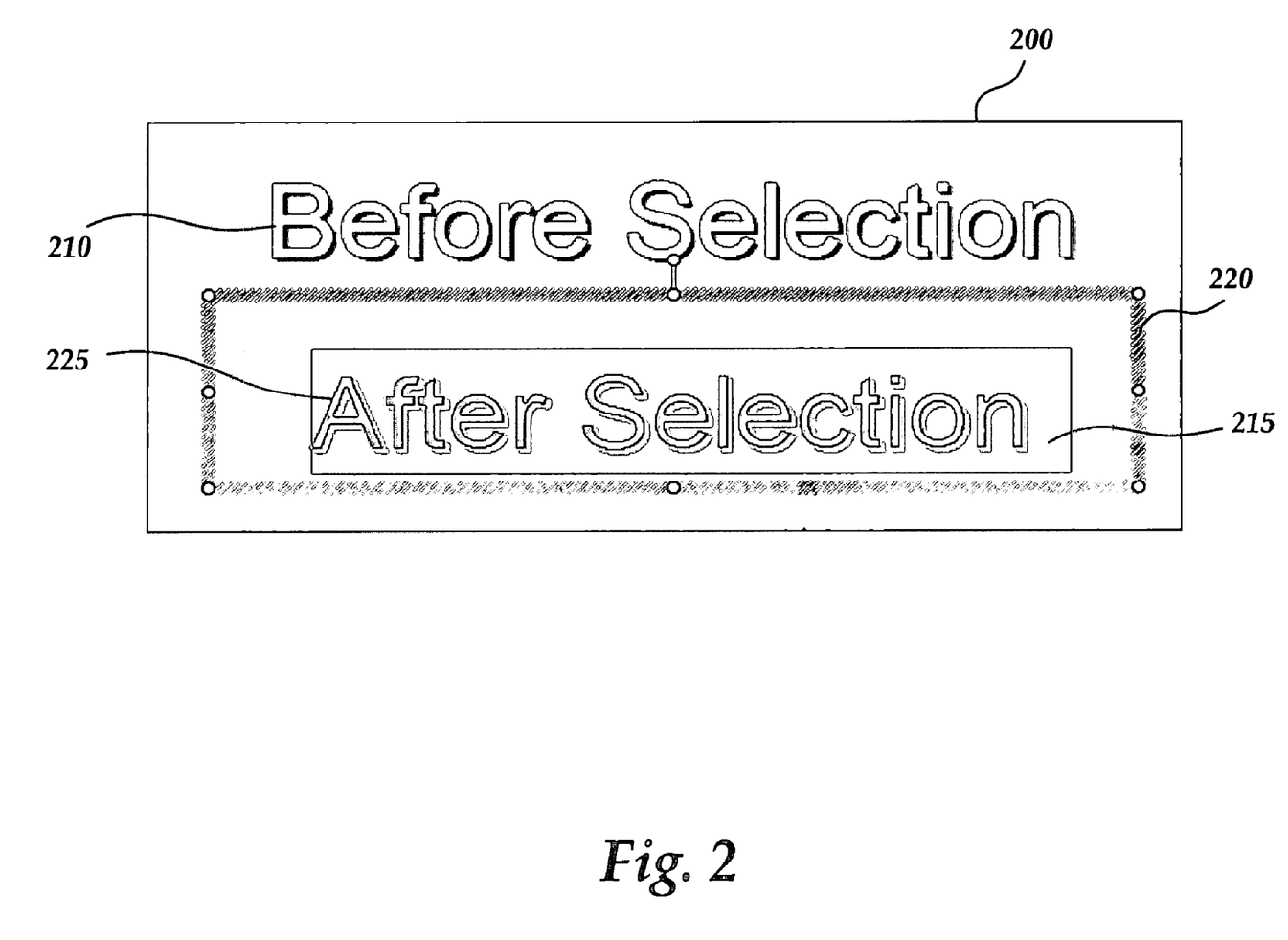
FIG. 2 illustrates a computer screen display showing the highlighting of a selected text entry according to prior methods and systems.

FIG. 2 illustrates a computer screen display showing the highlighting of a selected text entry according to prior methods and systems. Referring to FIG. 2, a user interface or operating system background 200 is illustrated having a background color and other properties selected by default via the associated operating system or selected by user application. A text selection 210 is illustrated for purposes of example having a text coloring and text formatting. According to prior methods, if the text entry is selected for applying formatting properties or other changes to the text entry, the coloring 225 of the text entry and a portion of the background underlying the text entry 215 are changed to different colors in order to create contrast with the underlying background colors of the user interface or work space 200. In addition, according to some prior methods and systems, an outline 220 is displayed around the selected object. As described above, application of prior highlighting techniques, as illustrated in FIG. 2, produces an unacceptable result because, while the selected object is highlighted, the user is not able to see the background coloring and other display properties underneath the highlighted object, and the user is not able to see the original coloring or other visual formatting properties applied to the selected object (for example, text entry) due to the change in color for generating highlighting contrast.

Figure 3:
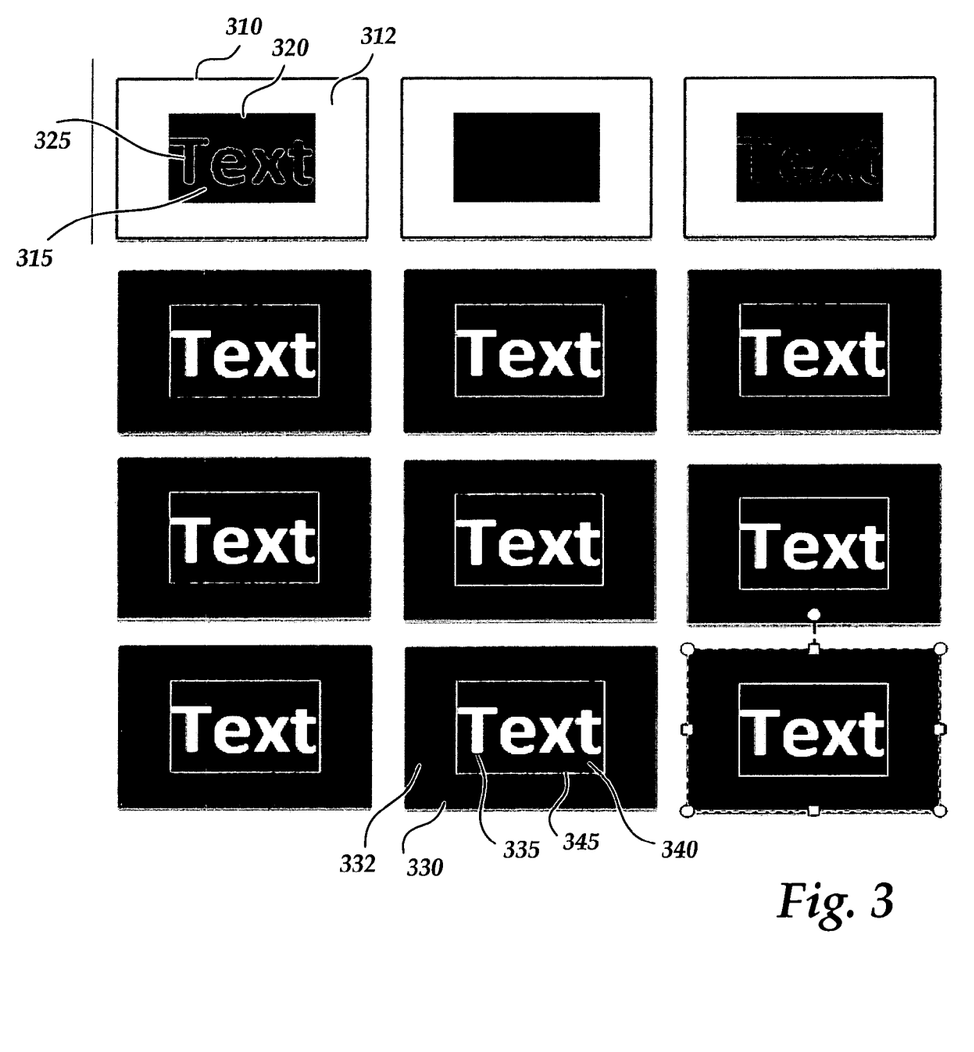
FIG. 3 illustrates a computer screen display showing the highlighting of a selected text entry.

According to embodiments of the present invention, an improved highlighting of selected content (text entries, images or other displayed objects) is provided. FIG. 3 illustrates a computer screen display showing the highlighting of a selected text entry according to embodiments of the present invention. For purposes of illustration, consider that the images illustrated in FIG. 3 are individual electronic slides from a slide presentation application document. In each of the illustrated slides, an example text entry is selected for application of a formatting property or other application functionality. For example, a given text selection may be selected for applying boldfacing to the text selection, changing the font size or font type of the text selection, changing the coloring of the text selection, and the like. In addition, the selected text entry may have been selected for application of some other functionality. For example, the selected text entry may be deleted, copied, moved, replaced, etc. Moreover, as should be appreciated by those skilled in the art, application of embodiments of the present invention for highlighting selected content is not limited to highlighting a selected text entry, as illustrated in FIG. 3. That is, embodiments of the present invention are equally applicable to highlighting selected images or other objects that may be displayed in an electronic document, for example, table objects, chart objects, picture objects, drawings, etc.

Referring still to FIG. 3, as will be described in detail below, according to embodiments of the present invention, a selected object 325, 335 in an electronic document, for example, a text entry in a word processing or slide presentation document, is highlighted by underlying the selected object with a semi-transparent background color 315, 340 that allows a user to see through the semi-transparent background coloring for viewing the coloring and other properties applied to the user interface background on which the object 325, 335 is displayed. That is, the transparency of the highlighting coloring underlying the selected object 325, 335 allows for seeing through the highlighting coloring to the background coloring and other visual properties 312, 332 of the user interface or work space 310, 330 on which the selected object is displayed. In addition, according to embodiments of the present invention, a semi-transparent border 320, 345 is drawn around the selected object for further contrasting the selected object from the background coloring and visual properties 312, 332 of the user interface or workspace on which the selected object is displayed.

Advantageously, the semi-transparent background color 315, 340 and the semi-transparent border 320, 345 allow for efficiently and distinctively highlighting a selected object when the selected object is displayed over many different display colors and display types. While the benefits of the background color and border apply to very basic, for example, white underlying display colors, the benefits of the semi-transparent background color and border are particularly helpful for highlighting selected objects displayed on display screens bearing many different display colors or properties, for example, electronic water marks.

Figure 4:
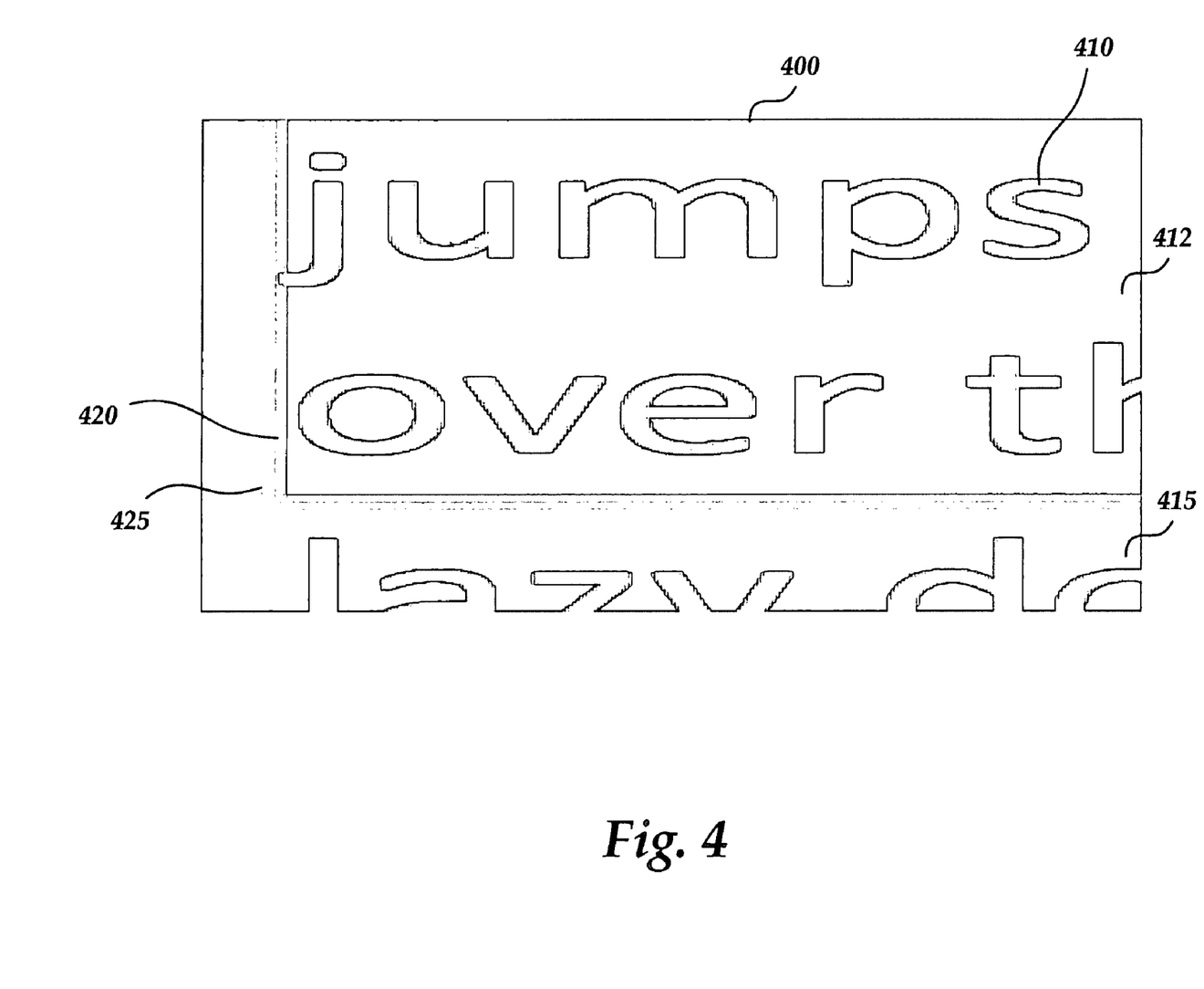
FIG. 4 illustrates a computer screen display showing the highlighting of a selected text entry.

Referring now to FIG. 4, another example text entry 410 is illustrated being highlighted according to embodiments of the present invention. The text entry 410 is displayed on a user interface display area or work area 400. The background color 412 applied underneath the selected text entry is semi-transparent for allowing a user to see through the highlighting coloring to the underlying user interface display or work area 400. As described above with reference to FIG. 3, in addition to the semi-transparent highlighting coloring applied underneath the selected object, a semi-transparent outline is drawn around the selected object 410 for further contrasting the selected object 410 from surrounding objects (text entries, images or other document objects). The border drawn around the selected object is a semi-transparent border comprised of a first semi-transparent line 425 having a first transparency value that is overlaid with a second semi-transparent line 420 having a second transparency value so that the line 420 contrasts slightly with the line 425 for creating a beveled look of the resulting semi-transparent border surrounding the selected object. According to one embodiment, the semi-transparent lines 420, 425 are colored white or other suitable light colors for providing a contrasting border. As should be appreciated, the use of overlapping lines 420, 425 are for purposes of aesthetics and viewing quality. That is, a single border line 420 or 425 may be utilized in place of the overlapping borderlines 420, 425 for outlining the selected object.

Figure 5:
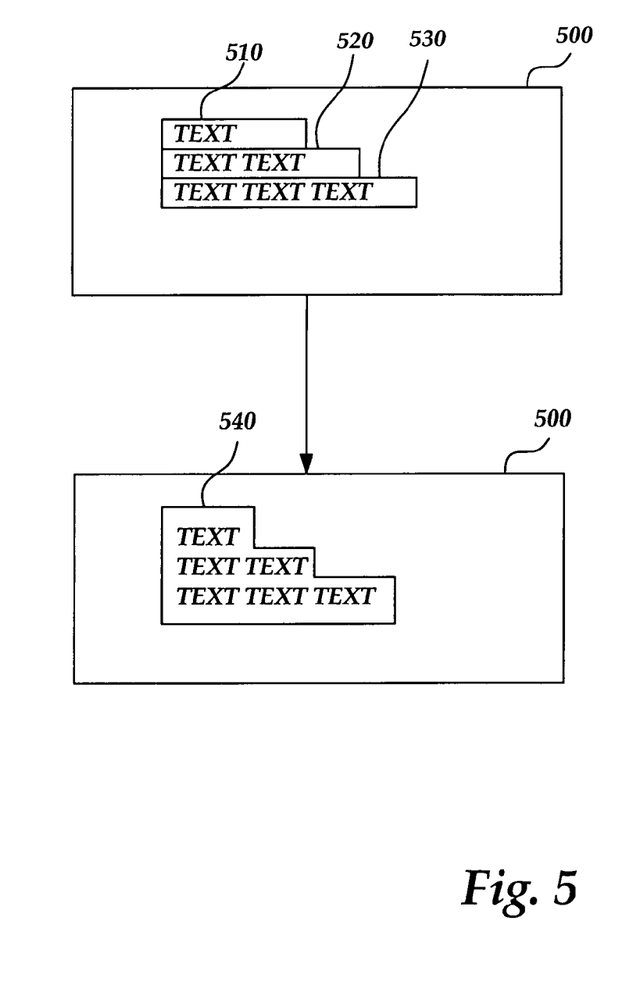
FIG. 5 is a simplified block diagram illustrating the construction of a single outlining path around a selected text entry.

FIG. 5 is a simplified block diagram illustrating the construction of a single outlining path around a selected object (for example, multiple lines of text). As described above, a part of the process of highlighting a selected text entry, image, or other object in an electronic document includes constructing a geometric outline around a selected object which when filled with highlighting color forms the highlighting of the selected object. For example, if a single text word, for example, the word "text" is highlighted by a user for performing some type of formatting or other function on the highlighted word, a generally rectangular-shaped outline is constructed around the highlighted word. Referring to FIG. 5, an outline 510 is illustrated constructed around the word "text" in a first line of three lines of example text entries.

According to embodiments of the present invention, if the word "text" inside the outline 510 is the only object selected for highlighting, then the outline 510, which is a rectangular-shaped outline around the selected word, is filled with highlighting color and is replaced with an semi-transparent outline, as briefly described above. However, according to embodiments of the present invention, if an irregular-shaped object is selected for highlighting, for example, the three lines of text illustrated in FIG. 5 each of which have different lengths and which when combined as a unit form an irregular shape, then individual geometric outlines may be constructed around each line of text, as illustrated in FIG. 5. That is, a first generally rectangular-shaped outline 510 is constructed around the first sentence, a second generally rectangular-shaped outline 520 is constructed around the second sentence, and a third generally rectangular-shaped outline 530 is constructed around the third sentence. As should be appreciated, according to embodiments of the present invention, there is -no limitation of using rectangular-shaped or rectilinear-shaped outlines for outlining a selected object. For example, a circular-shaped outline may be used around a selected image or other objects that would best outline the image or object as opposed to a rectangular-shaped outline. On the other hand, if a selected object, for example, a picture or other image in an electronic document is irregular in shape, then a number of individual geometric outlines, for example, the plurality of rectangular-shaped outlines 510, 520, 530, as illustrated in FIG. 5, may be utilized for outlining the entire irregular-shaped object.

Referring to the lower half of FIG. 5, according to embodiments of the present invention, and as will be described in detail below, any intersecting lines between multiple geometric outlines 510, 520, 530 are removed from the visual display of the ultimate highlighting of the selected text entry, image or other object to provide a better visual display of the highlighting of the selected object. The intersecting lines between the multiple geometric outlines 510, 520, 530 are removed by painting the desired highlighting color, for example, a light blue color or light yellow color, over all space interior of the combined geometric outlines so that, while the outer perimeter of the combined geometric outlines remains a visible outer path for the overall highlighting, the intersecting lines between the multiple geometric outlines are covered from view. Thus, as illustrated in the lower half of FIG. 5, the resulting visual appearance indicates that the multiple geometric outlines 510, 520, 530 are merged into a single geometric path 540 forming an outline around the entire selected object (for example, an irregular text object). As illustrated above in FIGS. 3 and 4, once the geometric path around the selected object is created, the interior of the geometric path or outline is filled with highlighting color, and the geometric path or outline is replaced with an semi-transparent line that will be visible to a user on the user's display screen.

Figure 6:
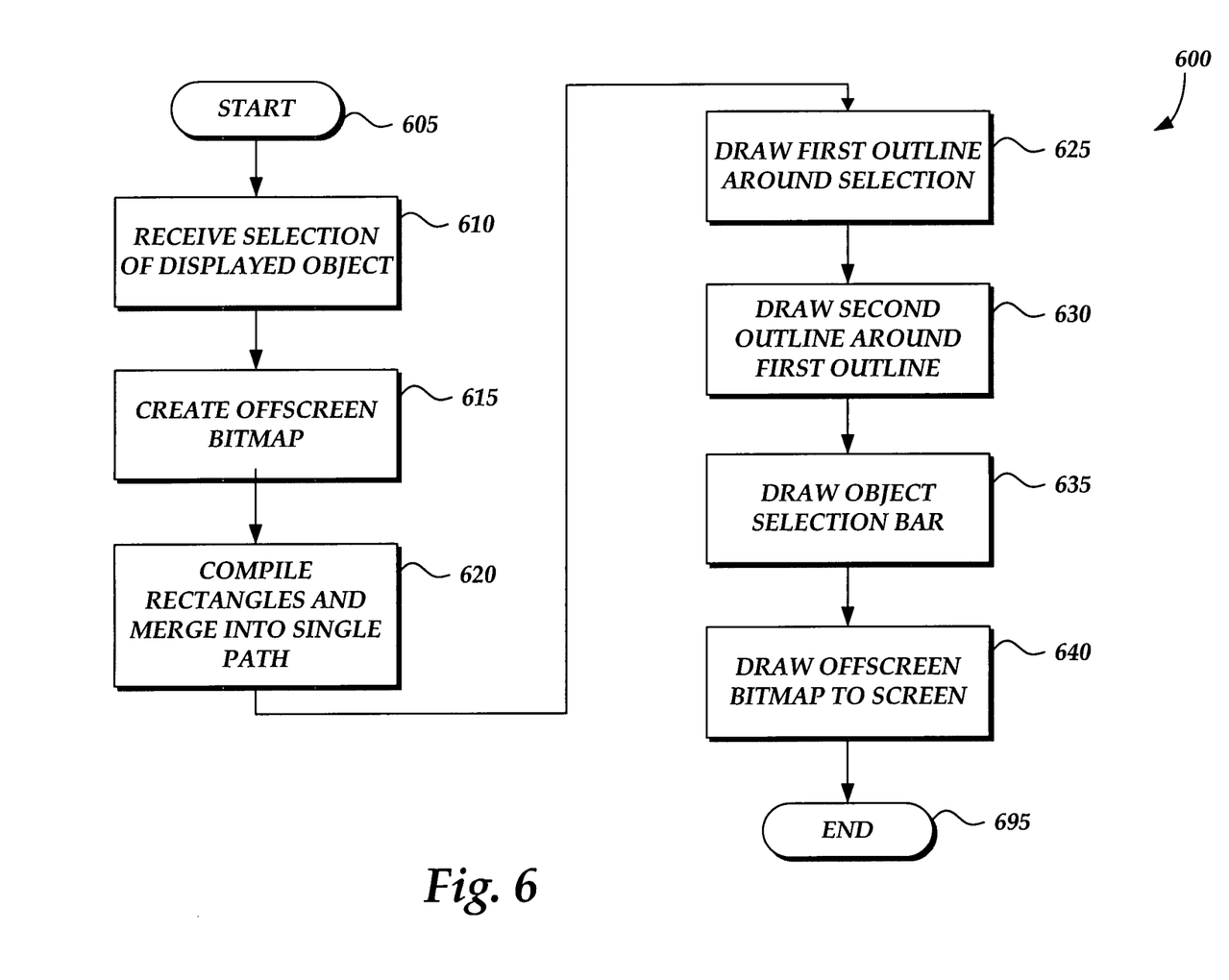
FIG. 6 is a logical flow diagram illustrating a method for highlighting text, images or other objects in an electronic document.

Having described the visual aspects of the various components of a highlighting applied to a selected object according to embodiments of the present invention with respect to FIGS. 3, 4 and 5 above, FIG. 6 is a logical flow diagram illustrating a method for highlighting text, images or other objects in an electronic document. The highlighting routine 600 begins at start operation 605 and proceeds to object selection operation 610. At operation 610, a selection of a text entry, for example, a word or sentence, an image, for example, a picture or other graphical image, or any other object, for example, a table object, chart object, and the like, is received for application of some functionality of the software application with which the selected object is displayed. For example, the user may be operating a word processing application 106 with which the user has displayed a memorandum containing various text entries, photographs, chart objects, table objects and the like. At operation 610, the user may have selected three lines of text, as illustrated above in FIG. 5, for applying a formatting function of the word processing application, for example, boldfacing, font size, italics, etc. As should be appreciated by those skilled in the art, selection of a given object is by well-known means, for example, by dragging a cursor or other pointing device over the desired object.

At operation 615, in response to receiving the selection of the text entry, image or other object, for example, the three lines of text illustrated in FIG. 5, a bitmap image onto which a highlighting for the selected object will be drawn is created in memory by the responsible software application, for example, word processing application, spreadsheet application, slide presentation application, and the like.

At operation 620, geometric outlines are constructed around components of the selected object as described above with reference to FIG. 5. For example, if the selected object is a single word of text which, because of its shape, requires a generally rectangular-shaped outline, then such an outline will be constructed on the off-screen bitmap corresponding to a size which will outline the selected word. On the other hand, if the selected object is irregular in shape, for example, three lines of irregular length text, as illustrated above in FIG. 5, then multiple geometric outlines, for example, three generally rectangular-shaped outlines will be constructed around each line of text so that each line of text is outlined with a geometric path.

At operation 620, if multiple geometric outlines are utilized, for example, three rectangular-shaped outlines for outlining three irregular length text entries, the multiple geometric outlines are merged to form a single geometric path or outline around the entire selected object, as illustrated in FIG. 5. According to one embodiment, the merging of the geometric outlines is performed by determining the exact locations and lengths of each of the lines composing the geometric paths by determining the pixel locations and pixel lengths of each line comprising the individual geometric paths or outlines. An outermost single path is then identified and is designated as a single path around the entire object. As described above, intersecting lines between the different geometric outlines or paths are eliminated by painting over the intersecting lines with the highlighting coloring that will be used to highlight the selected object.

At operation 625, a first semi-transparent outline 425, as illustrated in FIG. 4, is drawn over the single geometric outline or path 540 that encloses the entire selected object. According to an embodiment of the present invention, the first semi-transparent outline may have varying widths and varying transparency for both indicating an outer perimeter of the highlighting applied to the selected object and for allowing a user to see through the outline to the background color and properties of the display screen beneath the outline. According to one embodiment, the first outline has a width of two pixels, a transparency value of 30% and a white coloring.

At operation 630, if desired, a second semi-transparent outline 420 may be drawn over the first outline 425 with a different width than the first outline 425 and with a different transparency value than the first outline 425 in order to provide a visual effect, for example, beveling, for the outline that will surround the highlighting of the selected object. According to one embodiment, the second outline has a width of one pixel, a transparency value of 40% and a white coloring, which will generate contrast with the first outline 425 and which will produce the desired visual effect, for example, beveling. As should be appreciated, the second outline is for purposes of aesthetic and other visual properties and is not required for forming a semi-transparent outline around the highlighting 412 of the selected object.

At operation 635, the interior of the outer geometric path 540 is filled with colored pixels associated with the desired highlighting color, for example, light blue, light yellow, etc., for creating a highlighting color that will lay underneath the selected object, for example, text entries. According to one embodiment, the pixel coloring applied in the interior of the path 540 has color values matching the operating system selection color, for example, blue, but with an applied transparency value which causes a transparent or semi-transparent effect for the highlighting color. According to one embodiment, the transparency value for the colored pixels is set at 40%. Instead of blending the color pixels applied to the interior of the geometric path 540 with color pixels that are applied to the bitmap image in the interior of the path 540, the semi-transparent colored pixels applied to the interior of the geometric path 540 replace any existing pixels applied therein.

The effect of this process is to provide a highlighting area that is similar in color to the coloring of the display over which the highlighting will be applied, but because of its transparency, allows the user to see through the highlighting to the background display. In effect, if the original background display coloring is blue, for example, application of a semi-transparent blue highlighting over the original display will cause the area underneath the selected object to appear slightly darker in color than the surrounding area, but will allow the user to see through the highlighting to any visual properties on the display screen underneath the highlighting coloring.

In addition, filling the interior space inside the outer geometric path or outline 540, as described herein, replaces pixels that are presently drawn into the off-screen bitmap, for example, pixels defining intersecting lines between the various geometric paths or outlines 510, 520, 530 so that those intersecting outlines are covered by the highlighting color used for filling the outer path 540. Thus, the intersecting lines are replaced with the fill color so that the intersecting lines are no longer visible, as illustrated inside the outer geometric path 540, illustrated in FIG. 5.

At operation 640, the off-screen bitmap is drawn onto the user's display screen over the location of the selected text entry, image or other object, as selected by the user. The selected object, for example, a text entry, is then drawn onto the bitmap that has been drawn onto the display screen. The resulting visual image will be the selected object on top of the desired fill coloring, which is geometrically outlined by the semi-transparent outlines 420, 425. Because the fill color has a transparency value allowing it to be semi-transparent, the user will be able to see through the highlighting fill color to the background display coloring to see any background display coloring or other visual properties applied to the background display.

Moreover, because the selected object will be drawn on top of the displayed bitmap image, any visual properties of the selected object will be seen by the user. For example, if the selected object drawn onto the displayed bitmap image is a text entry having a character size of 12 points and having a coloring of red, then the text entry drawn onto the bitmap will have a character size of 12 points and a coloring of red. If the user selects different formatting properties, for example, a character size of 14 points and a coloring of green, then those formatting properties will be apparent to the user as they are being made because the text entry being formatted by the user is positioned on top of the highlighting fill coloring applied to the bitmap image that has been positioned on the display screen. Thus, the problems associated with prior methods and systems for highlighting a selected object are overcome.

As described herein, embodiments of the present invention are directed to highlighting selected objects in an electronic document in a manner such that a highlighted object maintains coloring and formatting properties to allow for a maintenance of visual fidelity with a pre-highlighted view of the highlighted object and that allows for a semi-transparent background underneath a highlighted object that allows a user to see and appreciate the coloring and any visual properties applied to the background underneath the selected object. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of highlighting a selected object in an electronic document, comprising:

receiving a selection of an object displayed in an electronic document;

in response to receiving a selection of an object displayed in an electronic document, generating an image in a memory location;

drawing a geometric outline on the image, wherein the geometric outline is of a size and shape to form a path that encloses a space required for occupying the selected object;

performing, at a computing device, an operation that fills a space that underlies the selected object interior of the path with semi-transparent colored pixels of a highlighting color, thereby highlighting the selected object without changing a color of the selected object;

drawing the image onto an electronic display screen on which the selected object is displayed such that the path encloses a space on the display screen occupied by the selected object; and drawing the selected object onto the image such that the selected object is drawn in the space enclosed by the path and on top of the colored pixels filling the space interior of the path.

2. The method of claim 1, prior to filling a space formed interior of the path with colored pixels, further comprising drawing a first semi-transparent line over the path for forming a visual outline that encloses the space required for occupying the selected object.

3. The method of claim 2, wherein the first semi-transparent line has a width of at least two pixels.

4. The method of claim 3, wherein the first semi-transparent line has a transparency value of at least 30%.

5. The method of claim 4, wherein the first semi-transparent line has a color of white.

6. The method of claim 2, further comprising drawing a second semi-transparent line over the first semi-transparent line wherein the second semi-transparent line has a width that is narrower than a width of the first semi-transparent line.

7. The method of claim 6, wherein the second semi-transparent line has a width of at least one pixel.

8. The method of claim 6, wherein the second semi-transparent line has a transparency value of at least 40%.

9. The method of claim 1, wherein filling a space formed interior of the path with colored pixels for generating a highlighting color for the selected object includes filling the space formed interior of the path with colored pixels that match one or more colored pixels displayed on an electronic display area on which the selected object is displayed.

10. The method of claim 9, wherein filling a space formed interior of the path with colored pixels includes filling a space formed interior of the path with colored pixels having a transparency value of at least 40%.

11. The method of claim 1, wherein the geometric outline is generally rectangular-shaped.

12. The method of claim 1, wherein drawing a geometric outline on the image includes drawing a plurality of geometric outlines on the image each of said geometric outlines of varying sizes wherein the plurality of geometric outlines are organized as a grouping of geometric outlines such that a path formed around the grouping of geometric outlines encloses a space required for occupying the selected object.

13. The method of claim 12, further comprising drawing a first semi-transparent line over the path formed around the grouping of geometric outlines that encloses a space required for occupying the selected object.

14. The method of claim 13, further comprising drawing a second semi-transparent line over the first semi-transparent line wherein the second semi-transparent line has a width that is narrower than the first semi-transparent line.

15. The method of claim 14, further comprising filling a space formed interior of the path formed around the grouping of geometric outlines with colored pixels for generating a highlighting color for the selected object.

16. The method of claim 15, wherein filling a space formed interior of the path formed around the grouping of geometric outlines includes filling the space with colored pixels matching a color of an electronic display area on which the selected object is displayed.

17. The method of claim 16, wherein filling the space formed interior of the path formed around the grouping of geometric outlines includes filling the space with colored pixels having a transparency value of at least 40%.

18. The method of claim 15, wherein filling the space formed interior of the path formed around the grouping of geometric outlines with colored pixels includes replacing any pixels in the space formed interior of the path that form intersecting lines between the plurality of geometric outlines.

19. A computer readable storage medium containing computer executable instructions which when executed by a computer perform a method of highlighting a selected object in an electronic document, comprising:
    receiving a selection of an object displayed in an electronic document;
    in response to receiving a selection of an object displayed in an electronic document, generating an image in a memory location;
    drawing a geometric outline on the image, wherein the geometric outline is of a size and shape to form a path that encloses a space required for occupying the selected object;
    drawing a first semi-transparent line over the path for forming a visual outline that encloses the space required for occupying the selected object;
    filling a space that underlies the selected object interior of the path with semi-transparent colored pixels of a highlighting color, thereby highlighting the selected object without changing a color of the selected object;
    drawing the image including the first semi-transparent line onto an electronic display screen on which the selected object is displayed such that the path encloses a space on the display screen occupied by the selected object; and
    drawing the selected object onto the image such that the selected object is drawn in the space enclosed by the path and on top of the colored pixels filling the space interior of the path.

20. A computer readable storage medium containing computer executable instructions which when executed by a computer perform a method of highlighting a selected object in an electronic document, comprising:
    receiving a selection of a text entry displayed in an electronic document;
    in response to receiving a selection of the text entry displayed in an electronic document, generating a bitmap image in a memory location;
    drawing a generally rectangular-shaped outline on the image, wherein the geometric outline is of a size and shape to form a path that encloses a space required for occupying the selected text entry;
    drawing a semi-transparent line over the path for forming a visual outline that encloses the space required for occupying the text entry;
    filling a space that underlies the selected text entry interior of the path with semi-transparent colored pixels of a highlighting color, thereby highlighting the selected text entry without changing a color of the selected text entry;
    drawing the bitmap image including the semi-transparent line onto an electronic display screen on which the selected text entry is displayed such that the path encloses a space on the display screen occupied by the selected text; and
    drawing the selected text entry onto the image such that the selected text entry is drawn in the space enclosed by the path and on top of the colored pixels filling the space interior of the path.

* * * * *